United States Patent [19]

Go, deceased et al.

[11] Patent Number: 4,577,768

[45] Date of Patent: Mar. 25, 1986

[54] ETHYLENE POLYMER BLEND AND CONTAINERS PREPARED THEREFROM

[75] Inventors: Santos W. Go, deceased, late of Toledo, Ohio, by John W. Yager, administrator; Saleh A. Jabarin, Holland, Ohio

[73] Assignee: Owens-Illinois, Inc., Toledo, Ohio

[21] Appl. No.: 548,469

[22] Filed: Nov. 3, 1983

[51] Int. Cl.[4] .................... C08L 23/18; C08L 23/04
[52] U.S. Cl. .................... 215/1 C; 525/240; 206/524.5
[58] Field of Search .............. 525/240; 206/524.1, 206/524.5; 215/1 C

[56] References Cited

U.S. PATENT DOCUMENTS 3,280,220 10/1966 Nelson .................... 525/240
4,330,639 5/1982 Matsuura et al. ............ 525/240
4,367,256 1/1983 Biel ........................ 525/240

FOREIGN PATENT DOCUMENTS 52555 5/1982 European Pat. Off. ........ 525/240

*Primary Examiner*—Carman J. Seccuro
*Attorney, Agent, or Firm*—Philip M. Rice

[57] ABSTRACT

Polymer blends are disclosed which contain 75-90 weight % of a linear high-density ethylene polymer (density at least 0.94 gm/ml, melt index less than 0.5 gm/10 min) and 10-25 weight % of a linear low-density ethylene polymer (density less than 0.93 gm/ml, melt index less than 2.0 gms/10 min). The blends have a combination of physical properties and environmental stress crack resistance which make them well-suited for conversion to blow-molded containers for use in packaging aqueous detergent compositions.

18 Claims, No Drawings

ETHYLENE POLYMER BLEND AND CONTAINERS PREPARED THEREFROM

BACKGROUND OF THE INVENTION

Liquid containers blow-molded from linear high-density ethylene polymers are easily fabricated at modest cost and have received wide public acceptance as containers for many types of liquid products including distilled water, aqueous hypochlorite bleaches, vinegars, lubricating oils, and the like. Such containers also have been used for packaging of certain types of liquid detergent products. The use of such containers to package liquid detergent products has been somewhat restricted, however, by reason of the fact that many types of liquid detergent products accelerate the tendency of the container to exhibit stress cracking. Stress cracking is evidenced by the appearance of hazy cracks in the container which are aesthetically unpleasing to the ultimate consumer. In extreme cases, stress cracking can lead to leakage of the contents from the container. The stress crack resistance of linear high-density ethylene resins can be improved by blending such resins with other polymers such as butyl rubber, ethylene-propylene copolymer rubbers, and the like. The resulting blends, however, have reduced strength and stiffness and are not suitable for many packaging applications.

For the above reasons, there is need in the art for improved resin formulations containing linear high-density ethylene polymers and having improved resistance to environmental stress cracking. Such improved resin formulations, in addition to having improved resistance to environmental stress cracking, also will be required to maintain to a substantial degree the desirable physical properties of the linear high-density ethylene polymers presently employed in the manufacture of blow-molded containers.

SUMMARY OF THE INVENTION

The present invention provides an intimate fusion blend of two different classes of ethylene polymers having a desirable balance of properties making them eminently suitable for conversion into containers by blow-molding processes. The properties of such intimate fusion blends are set forth below:

| Property* | Value |
|---|---|
| Tensile Yield, psi | At least 2,000 |
| Ultimate Tensile, psi | At least 3,800 |
| Tensile Modulus, psi | At least 45,000 |
| Flexural Modulus, psi | At least 65,000 |
| Elongation at break, % | At least 650 |
| Melt Index, gms/min | Less than about 2.0 |

*The test methods employed are disclosed infra.

The blends of the invention contain about 75–90 weight % of at least one linear high-density ethylene polymer and about 10–25 weight % of at least one linear low-density ethylene polymer, with the further provision that said ethylene polymers constitute at least about 98 weight % of the total polymers contained in said blend.

DETAILED DESCRIPTION OF THE INVENTION

The blends of the invention will contain one or more linear high-density ethylene polymer. Each of the linear high-density ethylene polymer(s) included in the blends will have a density of at least about 0.94 gm/ml, a melt index of less than about 0.5 gm/10 min, and will have polymerized therein at least about 98 mol % ethylene with any comonomer polymerized therein being an alpha-monoolefin containing about 3 to 12 carbon atoms. Such linear high-density ethylene polymers are known and reported in the art and are commercially available from numerous commercial producers. Such linear high-density ethylene polymers are prepared by polymerizing ethylene, optionally in the presence of an alpha-monoolefin comonomer containing 4 to 12 carbon atoms, in the presence of certain metallic catalysts such as chromium catalysts, e.g. $CrO_3$ supported on silica-alumina supports, and the Ziegler-Natta catalysts, e.g., $TiCl_3$ employed in conjunction with certain aluminum alkyl cocatalysts. The requisite density and melt index desired in the polymer are obtained by proper control of polymerization conditions including temperature, pressure, comonomer concentration, and the concentration of telegenating agents such as hydrogen. The preferred linear high-density ethylene polymers will have a density of at least about 0.95 gm/ml. The especially preferred polymers will have a density of at least about 0.96 gm/ml.

The linear low-density ethylene polymer(s) included in the blends of the invention have a density in a range of about 0.91 to about 0.93 gm/ml, preferably in a range of about 0.91 to about 0.92 gm/ml, and especially about 0.92 gm/ml. The linear, low-density ethylene polymers will have a melt index of less than about 2.0 and preferably less than about 1.0 gm/10 min. It is desirable for the melt index to be close to the melt index of the linear high-density ethylene polymer included in the blend. These polymers are ethylene copolymers having polymerized about 2–6 and preferably about 4–6 mol % of an alpha-monoolefin containing about 3 to 12 carbon atoms with the balance of the monomer polymerized therein being ethylene. The linear low-density ethylene polymers employed in the present invention have long linear chains with controlled numbers of relatively short chain branches attached to the linear chain along its entire length. These side chains, or "branches," are short and will contain from about 1 to 10 carbon atoms depending upon the particular alpha-monoolefin employed in the preparation of the polymer. The linear low-density ethylene polymers differ structurally from low-density ethylene polymers made by high-pressure free-radical initiated polymerizations in having few, if any, long chain branches.

The linear low-density ethylene polymers are commercially available from multiple commercial sources. Such polymers are prepared by copolymerizing ethylene with an alpha-monoolefin containing about 3 to 12 carbon atoms in the presence of certain metallic catalysts of the same general type employed to prepare the linear high-density ethylene polymers discussed supra. The polymerization conditions employed in their preparation differ somewhat, and somewhat modified catalysts will be employed. One of the techniques to prepare such polymers involves copolymerizing ethylene and butene-1 in the vapor phase in a fluidized bed process. By reason of the constraints imposed by carrying out the polymerization in the vapor phase, the ethylene polymers prepared by this process are limited to copolymers of ethylene and butene-1. By operating in solvent systems, copolymers can be prepared from alpha-monoolefin comonomers containing up to 12 carbon atoms. The preferred linear low-density ethylene polymers for inclusion in the blends of the invention will be ethylene copolymers having polymerized therein at least one alpha-monoolefin comonomer containing 6 to 12 carbon atoms, and which optionally also will have copolymerized therein butene-1.

The proportions of the linear high-density ethylene polymer and the linear low-density ethylene polymer can be varied somewhat depending upon multiple considerations including the precise composition of the linear high-density ethylene polymer and the linear low-density ethylene polymer included in the blend, the configuration of the container to be blow-molded from the blend, and the composition to be packaged in the fabricated container. To obtain a significant increase in the environmental stress crack resistance of the blend of the invention, the blend should contain at least about 10 weight % of the linear low-density ethylene polymer. To obtain the requisite strength in blow-molded containers to stand the load that the containers will be sujected to in commercial usage, the blends should contain at least 75 weight % of the linear high-density ethylene polymer. For most general purpose uses, the blends should contain about 80–90 weight % of the linear high-density ethylene polymer and about 10–20 weight % of the linear low-density ethylene polymer.

In the preparation of virgin blends of the invention, it is preferred to employ a single species of the linear high-density ethylene polymer and a single species of the linear low-density ethylene polyer with the proportions of the two ethylene polymers being selected to meet the property specifications desired in the blend. In the preparation of blow-molded containers, as is known in the art, a certain percentage of trim material is recovered and must be recycled to achieve low manufacturing costs. The trim scrap is collected, comminuted to small particle sizes, and then blended with virgin polymers to prepare blends. The recycled material is referred to as "regrind". Regrind can be blended with the virgin polymers in the practice of the invention provided that certain precautions are observed. Specifically, the proportion of regrind included with the virgin ethylene polymers should be such that the polymer blend employed in blow-molding the containers contains the proportions of linear high-density ethylene polymer and the linear low-density ethylene polymer within the limits previously set forth with the further provision that the two designated ethylene polymers constitute at least 98 weight % of the polymer blend employed in the blow-molding operation. Any minor amounts of polymer not falling within the definitions of linear high-density ethylene polymer and linear low-density ethylene polymer as set forth above should be limited to other types of ethylene polymers.

The polymer blends of the invention, in addition to the polymeric components described above, also may contain minor amounts of other components conventionally employed with ethylene polymers used in the fabrication of blow-molded containers. Specifically, the blends of the invention can contain anti-oxidants, stabilizers, pigments, colorants, and the like conventionally employed in such polymers to serve their customary function.

The polymer blends of the invention will meet the minumum values and in many cases the preferred values for certain properties as set forth in Table I.

TABLE I

| Property | Minimum Value | Preferred Value |
| --- | --- | --- |
| Tensile Yield, psi | 2,000 | 3,200 |
| Ultimate Tensile, psi | 3,800 | 4,200 |
| Tensile Modulus, psi | 45,000 | 72,000 |
| Flexural Modulus, psi | 65,000 | 82,000 |
| Melt Index, gms/10 min | less than 2.0 | less than 0.5 |

The Tensile Values, the Modulus Values, and the Melt Index Values, are determined by standard ASTM methods employed in the ethylene polymer art, with the additional notation that the Melt Index Value is determined by ASTM 1238-70, Condition E, i.e., the normal load melt index value.

The following example is set forth to illustrate more clearly the principle and practice of the invention to those skilled in the art.

EXAMPLE 1

Part A

Polymer blends of the invention were prepared containing 80 and 90 parts by weight of a commercially available, linear high-density ethylene polymer having a density of 0.953 gms/ml and a melt index of 0.3, and 10 and 20 parts by weight of a commercially available, linear low-density ethylene polymer having a density of 0.920 gms/ml and a melt index of 1.0. The linear low-density ethylene polymer is believed to have been prepared by a solution polymerization process and is believed to contain octene-1 as the comonomer. The granules of the two ethylene polymers as received were tumbled to prepare a uniform physical admixture which then was passed through a compounding extruder and pelletized. As controls, to note any effects of processing on physical properties, separate batches of the linear high-density ethylene polymer and the linear low-density ethylene polymer were also extruded individually.

The extruder employed was a 30 mm co-rotating twin screw Werner Pfleiderer extruder Moder ZSK-30, having an L/D ratio of 27. The extrusion conditions were:

| Processing Paramemters | |
| --- | --- |
| Temperature, °C. | |
| Zone 1 | 170 |
| 2 | 200 |
| 3 | 200 |
| 4 | 204 |
| (strand die) 5 | 206 |
| Melt | 210 |
| Screw speed, rpm | 300 |
| Pressure, psi | 550 |
| Torque, % | 60–80 |
| Output rate, lbs./hr | 22–25 |

Part B

Test specimens were molded for measurement of physical properties. The experimentally determined values are set forth in Table II.

TABLE II

| Measured Properties (Test Method) | Compounds, ratio HDPE/LLDPE | | | |
|---|---|---|---|---|
| | 0/100 | 90/10 | 80/20 | 100/0 |
| Melt Index, gm/10 min (ASTM D-1238) | 0.103 | 0.082 | 0.091 | 0.568 |
| Flexural Modulus, psi (ASTM D-747) | 159,000 | 127,000 | 72,000 | 38,000 |
| Tensile Properties (ASTM D-638) | | | | |
| Elastic modulus, psi | 100,000 | 90,000 | 82,000 | 28,000 |
| Tensile yield, psi | 3,300 | 2,900 | 3,200 | 1,500 |
| Yield elongation, % | 7.7 | 9.5 | 8.3 | 13.9 |
| Ultimate tensile, psi | 4,600 | 4,600 | 4,200 | 4,400 |
| Ultimate elongatn., % | 664 | 704 | 715 | 900 |
| Molecular Weight | | | | |
| GPC $M_w$ | | 203,360 | 251,920 | 208,400 |
| $M_n$ | | 19,010 | 19,070 | 30,060 |
| $M_z$ | | 834,920 | 1,238,000 | 768,700 |
| $M_n$ | | 10.72 | 13.31 | 6.94 |
| Thermal properties DSC | | | | |
| Melting, °C. | Ti Tp Tf | | Ti Tp Tf | Ti Tp Tf |
| 1st heating | 64 140 149 | | 72 131 149 | 60 130 138 |
| Reheat | 65 134 145 | | 65 132 146 | 56 125 131 |
| Crystallization, °C. 1st heating | 123 116 64 | | 123 116 53 | 112 106 41 |

$M_w$ = Weight average molecular weight
$M_n$ = Number average molecular weight
$M_z$ = Z average molecular weight
$D_n = M_w/M_n$
Ti = Initial Temperature
Tp = Peak Temperature
Tf = Final Temperature The physical properties of the 90/10 and 80/20 blends are very acceptable for resin systems to be used to prepare blow-molded containers. The flexural modulus value for the 80/20 blend is unduly low by reason of an unascertained experimental error. If the value were redetermined, the flexural modulus value would be well in excess of 100,00 psi.

The suppliers' published property values for the two ethylene polymers included in the blends are set forth in Table III.

TABLE III

| | LHDPE | LLDPE |
|---|---|---|
| Melt Index, gm/10 min (ASTM D-1238) | 0.3 | 1.0 |
| Density, gm/cc (ASTM D-792) | 0.953 | 0.920 |
| Flexural Modulus, psi | 120,000 (ASTM D-747) | 44,000 (ASTM D-790) |
| 1% Secant Modulus, psi (ASTM D-638) | 115,000 | 30,000 |

Part C

The 80/20 blend of Part A and the linear high-density ethylene polymer were blow-molded into containers of oval cross-section having a 28-ounce capacity, and used to package Parson's brand ammonia employing a single cavity extrusion blow molding machine. Each container weighed about 50 grams. The processing conditions employed are set forth in Table IV.

TABLE IV

| Extrusion | |
|---|---|
| Temperature, °F. | |
| Zone 1 | 370 |
| 2 | 400 |
| 3 | 400 |
| 4 | 400 |
| 5 | 400 |
| 6 | 400 |
| 7 | 420 |
| 8 | 420 |
| 9 | 420 |
| 10 | 420 |
| Screw speed, rpm | 27 |
| Blow Molding | |
| Cycle time, seconds | |
| Final blow | 10 |
| Total | 16* |

*The total cycle time was 16 seconds for containers molded from the LHDPE resin, and 15 seconds for the ethylene polymer blend.

The strength of the containers in compression under storage conditions was determined by measuring their top load compression resistance by ASTM method D-2659-67. The value for the HDPE container was 25 pounds, and the value for the 80/20 blend was 24 pounds. It is thus seen that the strength of the container of the invention in storage is essentially equivalent to that of the prior art container. This result was surprising and unexpected in that containers blow-molded from linear low-density ethylene polymers have significantly lower values than corresponding containers blow-molded from linear high-density ethylene polymers.

Part D

Two of the blow-molded containers prepared in Part C from the 80/20 blend and two of the containers prepared from the linear high-density ethylene polymer were tested for environmental stress crack resistance employing an unusually severe test procedure. In the test, each of the containers was filled with about three fluid ounces of a popular proprietary aqueous dishwashing product containing an anionic sulfonate surfactant. This product was selected for inclusion in the test in that it was known to cause severe stress cracking in blow-molded containers prepared from linear high-density polymers. The containers were sealed and maintained at 140° F. The filled containers were examined on a daily basis, and the test was concluded when the containers cracked sufficiently so that the first visible evidence of liquid leakage was noted.

One of the containers fabricated from the linear high-density ethylene polymer developed a leak within 2 days of the initiation of the test. The second container fabricated from the linear high-density ethylene polymer developed a leak in the 20th day of the test. Neither of the containers fabricated from the ethylene polymer blend of the invention developed leaks in 50 days. It was both surprising and unexpected that such a marked improvement in the environmental stress crack resistance was obtained in containers fabricated from a blend containing 80 weight % of the linear high-density ethylene polymer.

While polymer blends and the blow-molded articles prepared therefrom herein described constitute preferred embodiments of the invention, it is to be understood that the invention is not limited to these polymer blends and blow-molded articles and that changes may be made therein without departing from the scope of the invention which is defined in the appended claims.

What is claimed is:

1. A plastic container having improved resistance to environmental stress cracking comprising a container formed from an intimate fusion blend of ethylene polymers; said blend containing about 75–90 weight percent of at least one linear high-density ethylene polymer and about 10–25 weight percent of at least one linear low-density ethylene polymer, said ethylene polymers constituting at least about 98 weight percent of the total polymers contained in said blend; each of the high-density ethylene polymer(s) included in the blend having a density of at least about 0.94 gm/ml, a melt index of less than about 0.5 gm/10 min, and having polymerized therein at least about 98 mol percent ethylene with any comonomer polymerized therein being an alpha-monoolefin containing about 3 to 12 carbon atoms; each of the linear low-density ethylene polymer(s) included in the blend having a density of less than about 0.93 gm/ml, a melt index of less than about 2.0 gms/10 min, and having polymerized therein about 2–6 mol percent of an alpha-monoolefin containing about 3 to 12 carbon atoms with the balance of the monomer polymerized therein being ethylene and the linear low-density ethylene polymer(s) included in the blend having a melt index higher than the melt index of the linear high-density ethylene polymer(s) included in the blend.

2. A plastic container according to claim 1 wherein said intimate fusion blend contains about 80–90 weight percent of the linear high-density ethylene polymer and about 10–20 weight percent of the linear low-density ethylene polymers.

3. A plastic container according to claim 2 in which at least one of the linear low-density ethylene polymers included therein is an ethylene polymer having copolymerized therein an alpha-monoolefin containing 6 to 12 carbon atoms.

4. A plastic container according to claim 1 in which the high-density ethylene polymer has a density of at least about 0.95 gm/ml and the linear low-density ethylene polymer has a density in the range of about 0.91 to about 0.92 gm/ml and a melt index of less than about 1.0 gm/min.

5. A plastic container according to claim 2 in which the high-density ethylene polymer has a density of at least about 0.95 gm/ml and the linear low-density ethylene polymer has a density in the range of about 0.91 to about 0.92 gm/ml and a melt index of less than about 1.0 gm/min.

6. A plastic container according to claim 3 in which the high-density ethylene polymer has a density of at least about 0.95 gm/ml and the linear low-density ethylene polymer has a density in the range of about 0.91 to about 0.92 gm/ml and a melt index of less than about 1.0 gm/min.

7. A plastic container comprising a threaded finish portion; a shoulder portion; a main body portion; and a bottom portion; said container being formed from an intimate fusion blend of ethlene polymers; said blend containing about 75–90 weight percent of at least one linear high-density ethylene polymer and about 10–25 weight percent of at least one linear low-density ethylene polymer, said ethylene polymers constituting at least about 98 weight percent of the total polymers contained in said blend; each of the high-density ethylene polymer(s) included in the blend having a density of at least about 0.94 gm/ml, a melt index of less than about 0.5 gm/10 min, and having polymerized therein at least about 98 mol percent ethylene with any comonomer polymerized therein being an alpha-monoolefin containing about 3 to 12 carbon atoms; each of the linear low-density ethylene polymer(s) included in the blend having a density of less than about 0.93 gm/ml, a melt index of less than about 2.0 gms/10 min, and having polymerized therein about 2–6 mol percent of an alpha-monoolefin containing about 3 to 12 carbon atoms with the balance of the monomer polymerized therein being ethylene; and the linear low-density ethylene polymer(s) included in the blend having a melt index higher than the melt index of the linear high-density ethylene polymer(s) included in the blend.

8. A plastic container according to claim 7 which contains about 80–90 weight percent of the linear high-density ethylene polymer and about 10–20 weight percent of the linear low-density ethylene polymers.

9. A plastic container according to claim 8 in which at least one of the linear low-density ethylene polyers included therein is an ethylene polymer having copolymerized therein an alpha-monoolefin containing 6 to 12 carbon atoms.

10. A plastic container according to claim 7 in which the high-density ethylene polymer has a density of at least about 0.95 gm/ml and the linear low-density ethylene polymer has a density in the range of about 0.91 to about 0.92 gm/ml and a melt index of less than about 1.0 gm/min.

11. A plastic container according to claim 8 in which the high-density ethylene polymer has a density of at least about 0.95 gm/ml and the linear low-density ethylene polymer has a density in the range of about 0.91 to about 0.92 gm/ml and a melt index of less than about 1.0 gm/min.

12. A plastic container according to claim 9 in which the high-density ethylene polymer has a density of at least about 0.95 gm/ml.

13. A plastic container according to claim 1 wherein said intimate fusion blend contains substantially 80 weight percent of the linear high-density ethylene polymer and substantially 20 weight percent of the linear low-density ethylene polymer.

14. A plastic container according to claim 3 wherein said intimate fusion blend contains substantially 80 weight percent of the linear high-density ethylene polymer and substantially 20 weight percent of the linear low-density ethylene polymer.

15. A plastic container according to claim 4 wherein said intimate fusion blend contains substantially 80 weight percent of the linear high-density ethylene polymer and substantially 20 weight percent of the linear low-density ethylene polymer.

16. A plastic container according to claim 7 wherein said intimate fusion blend contains substantially 80 weight percent of the linear high-density ethylene polymer and substantially 20 weight percent of the linear low-density ethylene polymer.

17. A plastic container according to claim 9 wherein said intimate fusion blend contains substantially 80 weight percent of the linear high-density ethylene polymer and substantially 20 weight percent of the linear low-density ethylene polymer.

18. A plastic container according to claim 10 wherein said intimate fusion blend contains substantially 80 weight percent of the linear high-density ethylene polymer and substantially 20 weight percent of the linear low-density ethylene polymer.

* * * * *